(12) United States Patent
Hartley

(10) Patent No.: US 7,366,551 B1
(45) Date of Patent: Apr. 29, 2008

(54) EXPANDABLE, MODULAR COMMUNICATIONS APPARATUS WITH INTERCHANGEABLE DEVICE AUTHENTICATION

(75) Inventor: Joel S. Hartley, Solana Beach, CA (US)

(73) Assignee: DriveOK, Inc., San Diego, CA (US)

( * ) Notice: Subject to any disclaimer, the term of this patent is extended or adjusted under 35 U.S.C. 154(b) by 130 days.

(21) Appl. No.: 10/971,377

(22) Filed: Oct. 22, 2004

Related U.S. Application Data (60) Provisional application No. 60/512,928, filed on Oct. 22, 2003, provisional application No. 60/512,929, filed on Oct. 22, 2003, provisional application No. 60/512,930, filed on Oct. 22, 2003.

(51) Int. Cl.
*H04M 1/00* (2006.01)

(52) U.S. Cl. ............... 455/575.1; 455/575.2; 455/418; 455/420; 455/411

(58) Field of Classification Search ............. 455/575.1, 455/575.9, 573, 557, 552.1, 556.1, 511, 575.2, 455/418, 420, 411

See application file for complete search history.

(56) References Cited

U.S. PATENT DOCUMENTS

| | | | |
|---|---|---|---|
| 6,212,415 B1 * | 4/2001 | Demuro et al. .......... 455/575.7 |
| 6,542,758 B1 * | 4/2003 | Chennakeshu et al. .. 455/569.2 |
| 6,580,906 B2 | 6/2003 | Bilgic et al. |
| 6,731,952 B2 | 5/2004 | Schaeffer et al. |
| 2002/0082043 A1 | 6/2002 | Wilska et al. |
| 2003/0064689 A1 | 4/2003 | Engstrom et al. |
| 2003/0073415 A1 | 4/2003 | Engstrom et al. |
| 2003/0073462 A1 | 4/2003 | Zatloukal et al. |
| 2003/0104791 A1 | 6/2003 | Engstrom et al. |
| 2003/0186729 A1 | 10/2003 | Engstrom et al. |
| 2004/0018863 A1 | 1/2004 | Engstrom et al. |
| 2004/0215958 A1 * | 10/2004 | Ellis et al. .................. 713/155 |
| 2005/0254630 A1 * | 11/2005 | Tokoro ....................... 379/52 |
| 2006/0117015 A1 * | 6/2006 | Bisbee et al. ................. 707/9 |

* cited by examiner

*Primary Examiner*—Duc M. Nguyen
*Assistant Examiner*—Eric J Elcenko
(74) *Attorney, Agent, or Firm*—Mintz, Levin, Cohn, Ferris, Glovsky and Popeo, P.C.

(57) ABSTRACT

A communications apparatus including a communications device for wide area network communications and position location, as an example, and one or more interchangeable devices capable of interfacing with the communications device through a standard interface, is described. Also described is an apparatus and method for activating and authenticating the communications device/interchangeable device combinations, thereby providing device compatibility and security.

20 Claims, 5 Drawing Sheets

EXPANDABLE, MODULAR COMMUNICATIONS APPARATUS WITH INTERCHANGEABLE DEVICE AUTHENTICATION

RELATED CASES

The present patent application claims the benefit of Provisional Patent Application Ser. No. 60/512,928 for "Method and apparatus to add multiple communications bearers to a mobile communications device" by Joel Scarbrough Hartley, which was filed on Oct. 22, 2003; Provisional Patent Application Ser. No. 60/512,929 for "Method and apparatus to authenticate two or more connectable parts in a mobile communications device and to activate services" by Joel Scarbrough Hartley, which was filed on Oct. 22, 2003; and Provisional Patent Application Ser. No. 60/512,930 for "Method and apparatus for a two part mobile communications device comprised of an outer part called the Shell and an inner part called the Module" by Joel Scarbrough Hartley, which was filed on Oct. 22, 2003, the disclosures and teachings thereof being hereby incorporated by reference herein.

FIELD OF THE INVENTION

The present invention is related generally to communications devices and, more particularly, to apparatus used for device-to-device communication where the communications apparatus interchangeably connects to other devices such as vehicles, computers, metering equipment, vending machines, surveillance equipment, and the like.

BACKGROUND OF THE INVENTION

Communications systems are typically created by integrating various components of the system into a single embedded device. A monolithic communications system is often the lowest cost, compact and rugged solution for high-volume products such as cellular telephone handsets, but it requires a substantial amount of development effort for each product variant. This development effort is not feasible in many device to device applications because of lower production volumes and the high degree of customization needed for each application. Thus, a need exists to provide a modular and customizable solution to device to device applications.

Another difficulty with modern communications systems is ensuring that all parts of the mobile system are authentic, that the mobile's features are allowed by the network and that all parts of the system are compatible. This is necessary to prevent fraud and to ensure correct behavior of the system. This problem is not evident in monolithic communications systems because such systems are integrated during the design process and authenticated when they are activated on a network. If the parts of the device or their connections are changed then adjustments must be made to the configuration. In computers this problem is managed by sophisticated user interfaces and elaborate setup procedures. However, in device to device communications systems, there are limited or no user interfaces to control the system configuration, so this process must be controlled remotely.

Accordingly, it is an object of the present invention to provide an apparatus for interchangeably connecting chosen devices to a communications system.

Another object of the invention is to provide an apparatus for interchangeably connecting chosen devices to a communications system and a method for activating and authenticating specific communications system/device combinations to ensure system device compatibility and security.

Additional objects, advantages and novel features of the invention will be set forth, in part, in the description that follows, and, in part, will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects of the present invention, and in accordance with its purposes, as embodied and broadly described herein, the apparatus having interchangeable devices capable of device authentication hereof comprises: (a) a communications apparatus including (1) a communications system comprising a wide area network terminal memory bearing a first electronic serial number; and a control processor bearing authentication agent firmware; (2) a standardized electronic interface; and (3) at least one interchangeable device having a device controller; memory bearing a second electronic serial number; and (3) an electronic interface capable of mating with said standardized electronic interface; and (b) an external authentication administrator for checking and verifying the first electronic serial number and the second electronic serial number.

In another aspect of the invention, in accordance with its objects and purposes, the composition of matter hereof A method for authenticating at least one device attached to a communications system, wherein electronic serial numbers are associated with both the at least one attached device and the communications system, said method comprising the steps of: reading the electronic serial numbers from the at least one device attached to the communications system and that for the communications system; comparing the electronic serial numbers from said step of reading the electronic serial numbers with a database of electronic serial numbers; generating a command to authorize the at least one device to function if said step of comparing the electronic serial numbers locates the electronic serial numbers in the database; and generating a command to inactivate the at least one device if said step of comparing the electronic serial numbers does not locate the electronic serial numbers in the database.

Not to be limited by the following, benefits and advantages of the present invention include the ability to remotely authenticate and either activate or shut down an expandable, modular communications apparatus.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION

Briefly, the present invention is a communications apparatus which includes: (a) a communications device such as a wide area network (cellular system), as an example; (b) one or more interchangeable devices; (c) at least one standardized interface adapted for connecting the one or more interchangeable devices to the communications device; and (d) means for authenticating and activating the interchangeable devices. Network applications software may be provided to more completely enable the interchangeable devices to be utilized. A power supply may be provided to provide electrical power to both the communications device and the one or more interchangeable devices. Interchangeable devices presently contemplated by the inventor include: test apparatus, universal serial bus (USB), microcomputer, Bluetooth, WiFi, car diagnostics, keypad and display, hand-free communications, GPS position location, and digital cameras, as examples.

Hardware, software revisions and feature capabilities of communications systems may change throughout the life of the product, and such changes often result in incompatibilities. In accordance with the teachings of the present invention, an authentication administrator stores device compatibility information such that combinations that cannot work together are not allowed, and combinations that are compatible are properly configured, so long as the user has authorization to use the devices.

An example of this concept has been developed by the inventor for use in vehicle location. This device uses a refurbished cellular handset for wide area network (WAN) communications, and its battery has been replaced by a circuit board capable of storing electronic serial numbers (ESNs) memory chips, a global positioning system (GPS) receiver for positioning location, a microprocessor for controlling the operation of the device, and a power adapter which connects to the battery of the vehicle in which the apparatus is installed, and a standardized interface connector, among other components.

The interface connector is of the card edge variety so that the interchangeable device circuit board can plug directly into it, thereby making electrical contact through connections on the edge of the card. A small EEPROM contains the interchangeable devices ESN. One such device has been constructed by the inventor, and includes an RS-232 interface, audio interface microprocessor programming port, GPS antenna port, and system reset. The communications apparatus supports one interchangeable device in the current configuration, but clearly multiple interchangeable devices could be accommodated on the unit using expansion cards. It is intended that authentication hardware and software, as will be described in detail hereinbelow, will be installed to complete the communications apparatus in accordance with the teachings of the present invention.

The housing for the communications apparatus is constructed from a three-part ABS plastic assembly and encloses the above-described cellular telephone, circuit board and interchangeable device. Connectors extend from one end of the housing to permit connections for power, to speakers for the audio function, to the GPS antenna, and other external devices.

Figure 1:
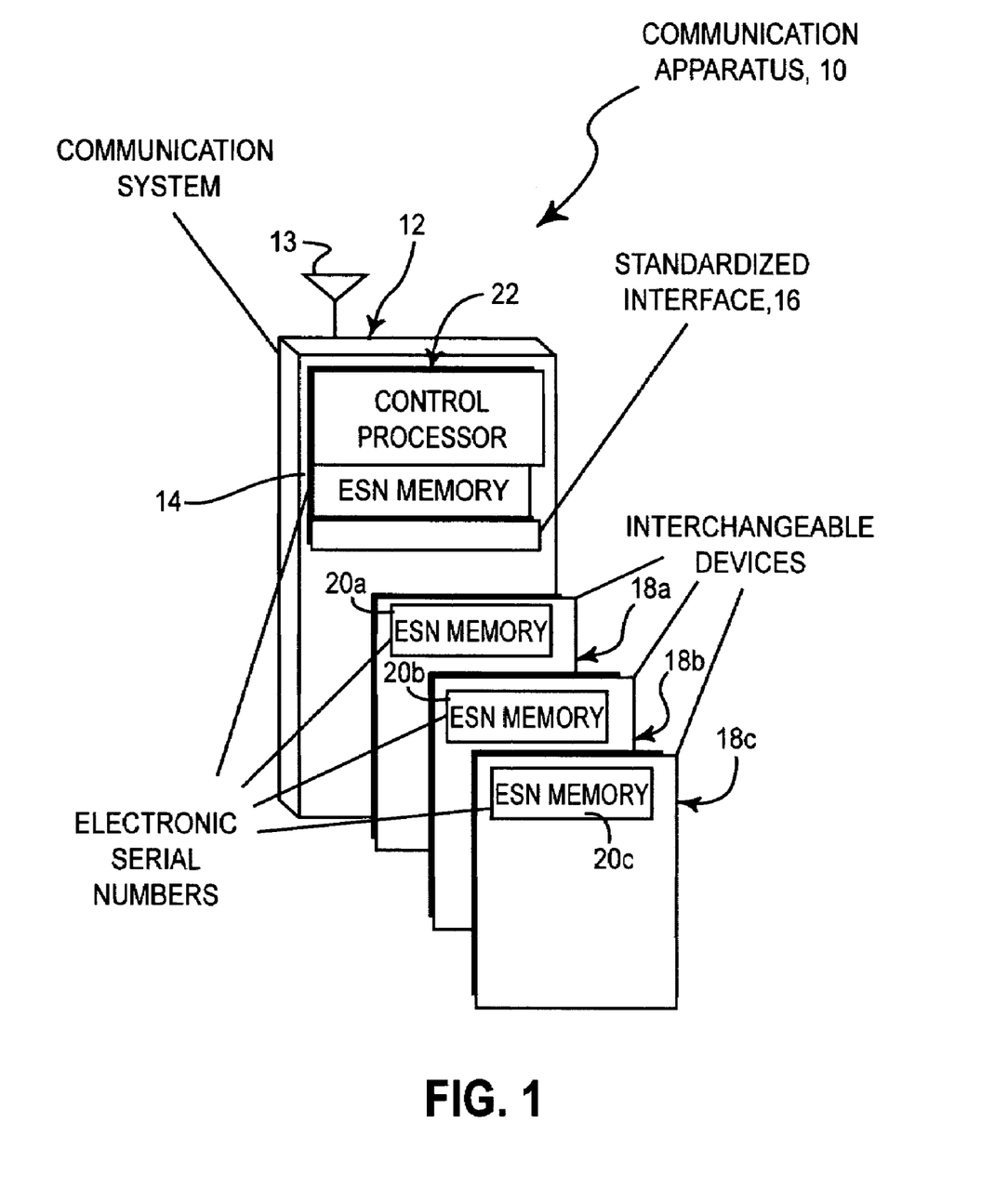
FIG. 1 is a schematic representation of the communications apparatus of the present invention illustrating the communications apparatus which has an electronic serial number (ESN); the standard interface; device interface cards, also having electronic serial numbers (ESN); and means for authentication.

Reference will now be made in detail to the present embodiments of the invention, examples of which are illustrated in the accompanying drawings. In the description that follows, similar or identical structure will be identified using identical callouts. Turning now to the drawings, FIG. 1 is a schematic representation of the communications apparatus, 10, of the present invention illustrating communications system, 12, having an antenna, 13, and an electronic serial number (ESN) which resides in memory, 14; standard interface, 16; interchangeable devices, 18a-18c, also having electronic serial numbers (ESN) residing in memory chips, 20a-20c, respectively; and means for authentication, which includes an authentication agent residing on control processor, 22. It should be mentioned that at least one interchangeable device 18 and perhaps more than one device can be attached and operated using communications system 12, dependant upon how many interface positions 16 are made available on communications system 12.

Figure 2:
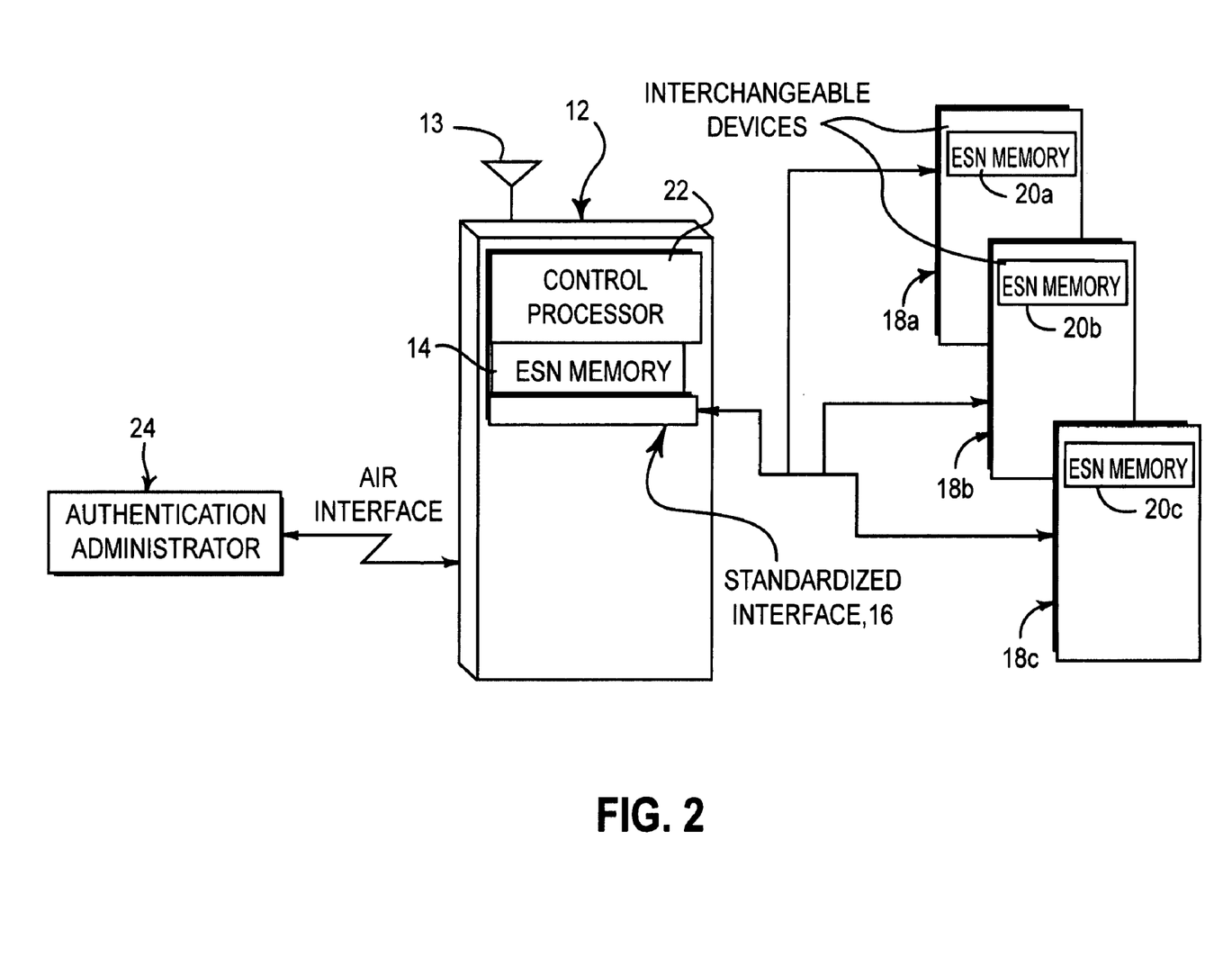
FIG. 2 is a schematic representation of architecture for the authentication and activation system.

FIG. 2 is a schematic representation of architecture for the authentication and activation of communications system 12 and its interchangeable devices, 18, showing authentication administrator, 24, to which communication system 12 is in wireless communication. Both the communication system and interchangeable devices can be wirelessly authenticated and activated by a remote authentication administrator based on a unique electronic serial number on each device, thereby assisting in the prevention of fraud and identifying incompatibility of devices with the communications system.

Control processor 22 bears the authentication agent firmware, represents authentication administrator 24 bearing administrator software on communications system 12, and has three functions: (1) reading the ESN located in the ESN memory from each connected device, and that for the communications system itself, and reporting these numbers to the authentication administrator; (2) monitoring correct behavior of each connected interchangeable device, and that for the communication system itself, and reporting anomalies to the authentication administrator; and (3) receiving authorization commands from the authentication administrator from which the functionality of the communications system and the interchangeable devices is either allowed or disabled as is specified by the authentication administrator. By "agent" it is meant software that runs on a client computer for use by administrative software running on a server. Agents are typically used to support administrative actions such as detecting system information or running.

The authentication administrator may reside on the network side of a wide area network, and the communications system may be a mobile communications system, as an example. In such a situation the controller may wirelessly receive an ESN report from the authentication agent on the mobile communications system, and responds with an authorization command. Upon receiving the ESN report the authentication controller searches its data base to determine if each ESN is valid. The correct functionality on the mobile communications apparatus is then enabled, based on the following information, as examples: (a) the capabilities of the mobile communications system and the interchangeable devices; (b) any mobile communications system and interchangeable device software and hardware changes; (c) user selected preferences; (d) wide-area network capabilities; and (e) network application software capabilities.

Authentication is generally performed when the mobile communications apparatus configuration is changed. This may occur when an interchangeable device is added or removed or when an external apparatus connected to the interchangeable device is changed. The authentication agent may also report changes in the performance of any connected device. If, for example, an interchangeable device breaks and no longer responds to the authentication agent, the authentication agent would send a report to the authentication administrator, thereby permitting defective devices to be tracked and repaired.

The authentication controller may check ESNs and proper operation of all connected devices on a regular basis to determine if interchangeable devices are added or removed from the communications system, and to monitor correct operation of these devices. It reports the authentication controller only when the connection of a device or its performance changes. The authentication administrator may update the authentication agent at any time, either remotely or by direct contact.

Figure 3:
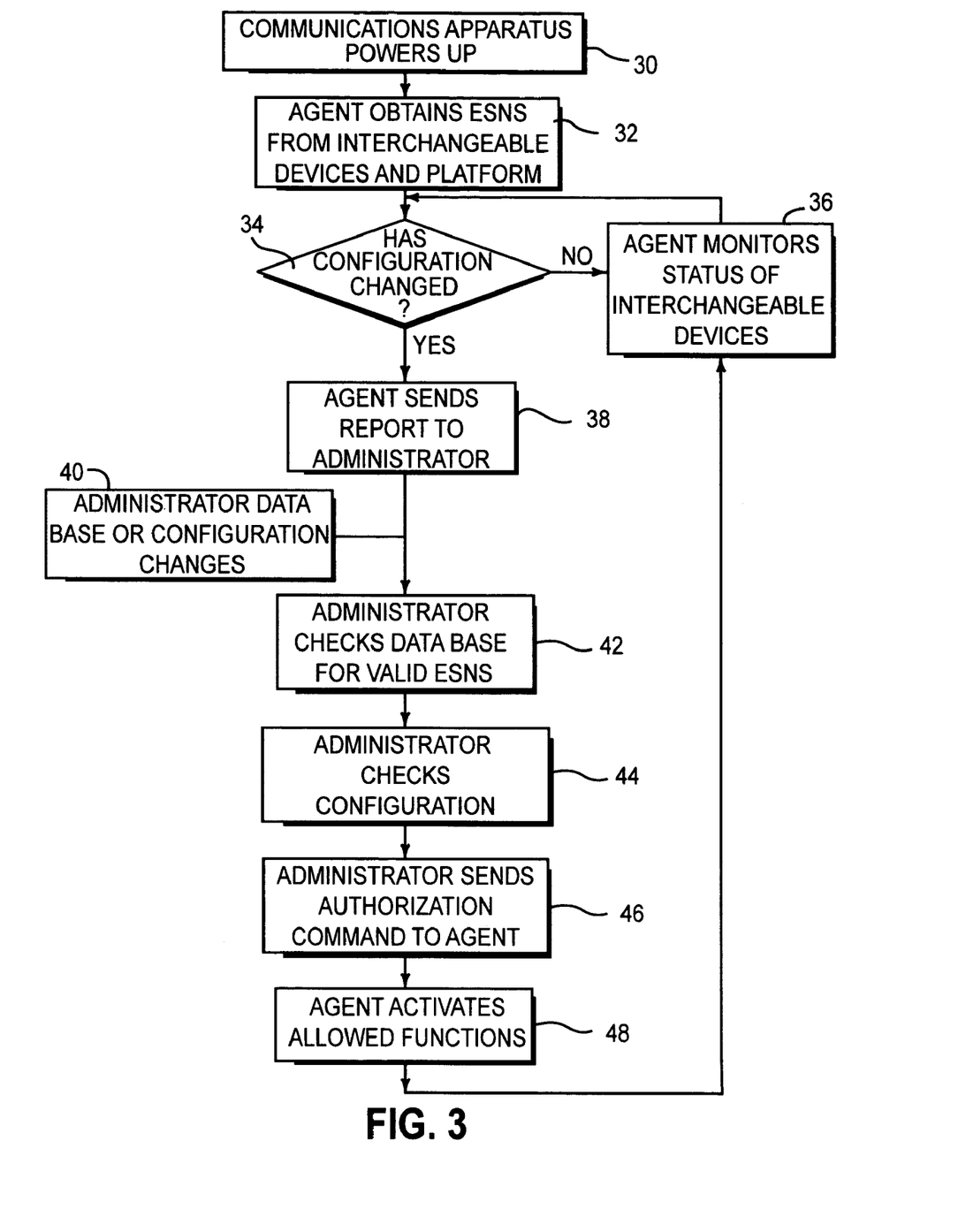
FIG. 3 shows a flow chart of an example of an authentication process.

FIG. 3 shows a flow chart of an example of an authentication process. After the communications system is powered on, 30, the authentication agent reads the electronic serial numbers from the devices attached to the communications system and that for the communications system itself, 32. A determination is then made by the communications system as to whether the serial numbers have changed which would indicate a change in configuration of the communications apparatus, 34. If there is no change, the authentication agent simply monitors the status of the connected devices, 36. If a change has occurred, the authentication agent wirelessly transmits a report to the authentication administrator, 38, which checks its database, 40, for valid electronic serial numbers, 42. The authentication administrator then checks the configuration information from electronic serial numbers obtained, 44, and sends an authorization command to the authentication agent, 46, thereby directing the authentication agent to activate the allowed functions, 48. The authentication agent then continues to monitor the status of the connected devices while the communications system remains powered. Whenever the administrative data base or network configuration changes, the authentication administrator again checks the configuration information from the electronic serial numbers received, 44, and sends an authorization command to the authentication agent, 46 which permits the communications system to remain operational. If the electronic serial numbers are not found in the database, an inactivation command would be sent to the authentication agent, which would inactivate or depower the function of the device. It should be mentioned that the initial check of serial numbers might locate serial numbers which are not in the serial number database (invalid serial numbers), even if these numbers have not changed. In this situation as well, an inactivation command would be sent to the authentication agent, which would inactivate or depower the function of the device.

In summary, an example of a method for authenticating and activating all elements of the system based on unique electronic serial numbers (ESNs) in each device being transmitted by an authentication agent on the communications system to a remote authentication administrator on the network has been described. Valid ESNs are activated by sending an activation code from the remote authentication controller to the authentication agent on the communications system, after which the authentication agent activates whatever functions are allowed by the authentication administrator or disables an invalid device.

Figure 4:
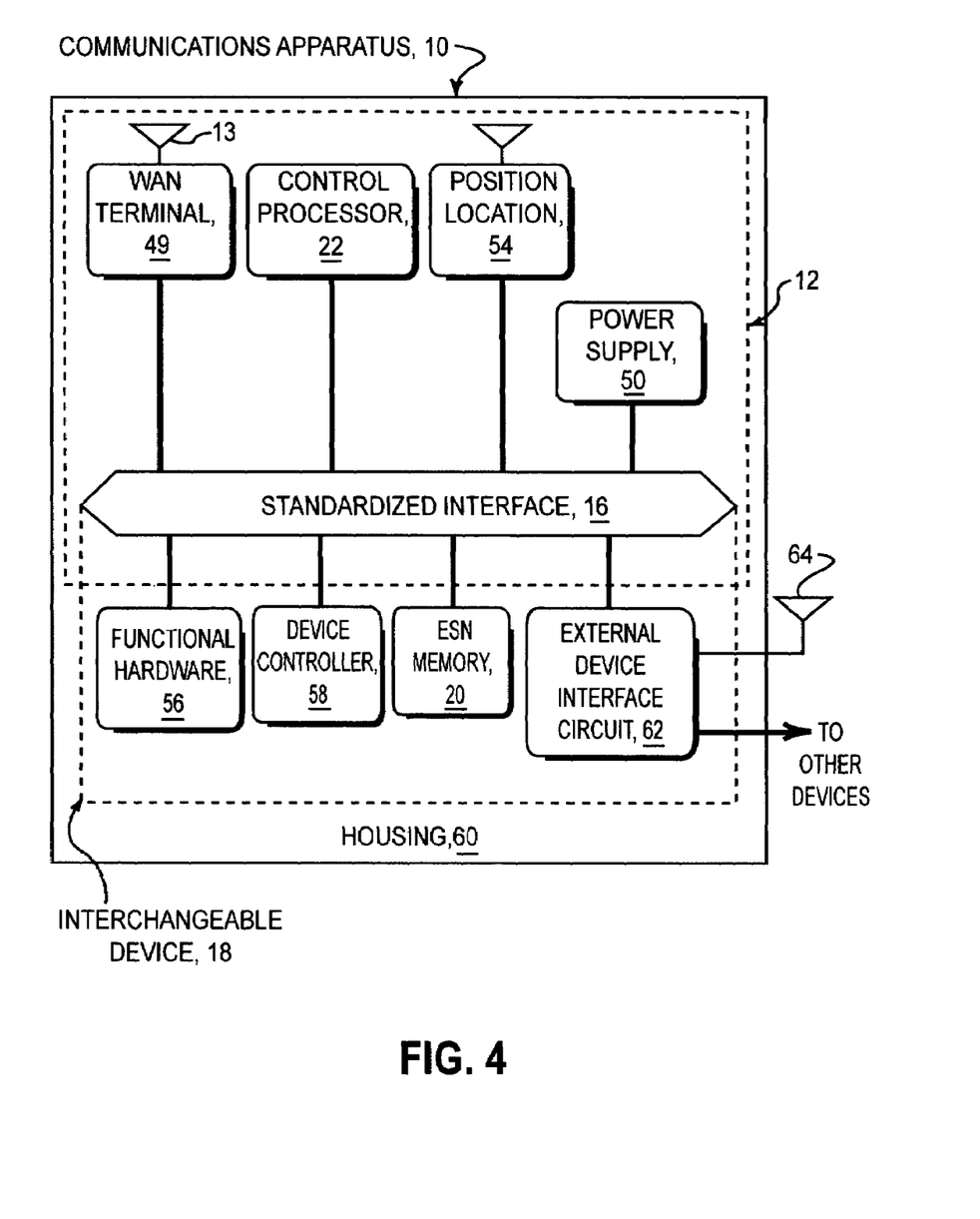
FIG. 4 is a schematic representation of the communications system and the device interface card hardware.

FIG. 4 is a schematic representation of the hardware for communications apparatus 10 of the present invention which includes communications system 12, standardized interface 16, and interchangeable device 18. Communications system 12 includes wireless wide area network (WAN) terminal, 49, for providing basic communications, standardized interface 16, power supply, 50, control processor, 22 which includes the communications system ESN in memory, and optional position location device, 54. Interchangeable device 18 includes a connector, not shown in FIG. 4, adapted to mate with standardized interface 16, ESN memory chip 20, and functional hardware, 56, which provides the functional capability of the device, such as a digital camera, as an example. Device controller, 58, enables interchangeable device 18 to communicate with communications system 12. The hardware may be enclosed within housing, 60. An optional external device interface circuit, 62, for attaching interchangeable device 18 to external devices may also be provided. It is anticipated that in some situations, the communication between device 18 and external devices will occur wirelessly through antenna, 64. It should be mentioned that the communications system ESN can also be located in a separate memory outside of control processor 22.

Standardized interface 16 generates compatibility between different communications systems and interchangeable devices.

Wireless WAN terminal 49 may be a mobile communications device for permitting two-way voice and data communications with a wireless network over an air interface, such as a cellular phone, two way pager or digital cordless phone, as examples, or may be a stationary communications device. The WAN may be connected to the network by one or more of the following channels: voice channel, control channel, paging channel, circuit switched data, packet data or short message service (SMS).

Power supply 50 is a device for providing electrical power to communications apparatus 10 which includes any connected devices, and may be disposed externally, as in the case of a vehicle battery, as an example, or internally to the communications apparatus.

Housing 60 includes an enclosure which provides protection of the enclosed hardware from the elements, means for mounting the interchangeable devices, means for identifying the contents thereof including electronic serial numbers of the communications system and the interchangeable devices, and input/output means for providing communications with external devices.

Position location device 54 may be any device that determines the latitude and longitude of communications apparatus 10. A common type of location device is the GPS based on orbiting satellites. It should be mentioned that position location device 54 can be configured such that it is one of the interchangeable devices.

Each interchangeable device of the present invention may include a device controller 58 which renders the desired function of an interchangeable device compatible with communications system 12. In some embodiments of the invention, controller 58 may include additional communications bearers (wired or wireless), an application processor running application software, test and validation equipment, instrumentation, and controls.

Standardized interface 16 consists of a physical connection, electrical specifications and software protocol definitions. The physical connection includes the connector type and pin out, the board size and component clearance necessary for each interchangeable device to fit into standard enclosure 60. The electrical interface specifies the function and electrical characteristics of each signal on the interface connector. As will be described hereinbelow, a software interface specifies how multiple processors communicate across the interface and how authentication information is transferred.

As stated, control processor 22 of FIG. 4 bearing the authentication agent firmware is the representative of authentication administrator 24 on communications apparatus 10. It has six functions: (1) reading ESNs from each connected interchangeable device and that for the communications system itself; (2) reporting the ESN to the authentication administrator, (3) monitoring the correct behavior of each connected device and that for the communications system itself; (4) reporting anomalies to the authentication administrator; (5) receiving authorization commands from the authentication administrator; and (6) allowing or disabling functionality of the communications apparatus and interchangeable devices as specified by the authentication administrator.

The authentication agent monitors the status of all connected devices (see FIG. 3, hereof) by providing a sanity check from each device, using a well-known method generally termed "Watchdog," as an example. A watchdog timer provides a means of graceful recovery from a system problem. If the program fails to reset the watchdog at some predetermined interval, a hardware reset will be initiated. The "Watchdog" process finds significant use in industry. Each device controller 58 sends a periodic signal to a master device termed the watchdog controller or, in the present situation, the authentication agent firmware running on control processor 22. If the device ceases operating according to criteria set for this, the periodic signal stops and the watchdog controller detects an error. It then responds by resetting or removing power from that device and then restarting it. If the condition persists authentication agent may permanently disable the device or disable the entire system. A report of this condition would be sent to the authentication administrator.

There are other procedures suitable for authentication, many using a challenge and response approach, which all relies on encryption technology. The method of the present invention provides a simpler approach; that of requiring a central data base in the authentication administrator for keeping a record of the ESNs and the properties of the interchangeable devices.

Figure 5:
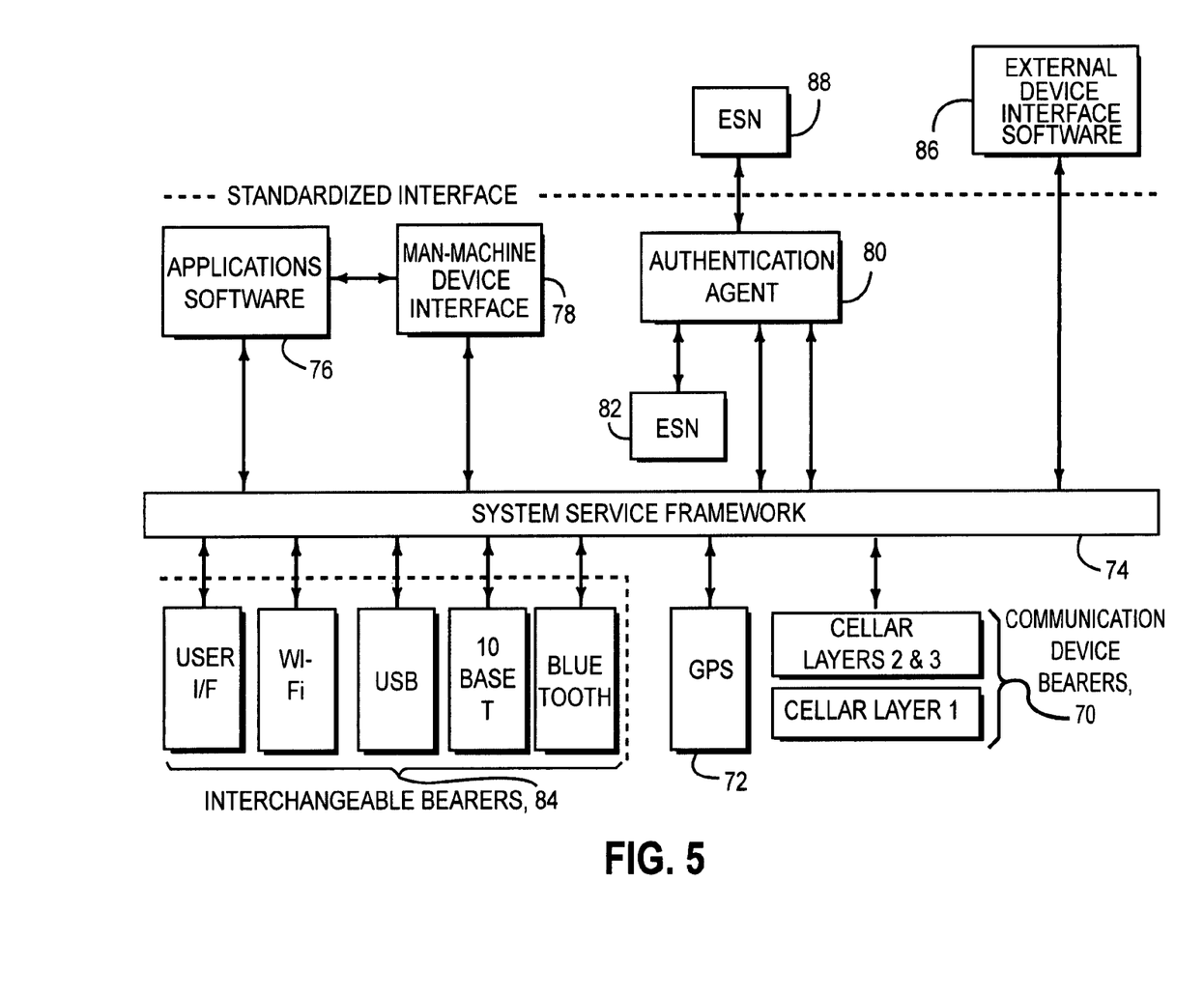
FIG. 5 is a schematic representation of the communications system software and the interchangeable device software.

FIG. 5 is a schematic representation of the communications system software and the interchangeable device software. The software architecture may be a layered structure made up of a plurality of functional blocks. Each functional block is related to a hardware function or software process. The layering helps to make the software modular so that each function can operate independently. The principal blocks residing in communications system 12 include communications device bearers, 70 and 72, system services framework, 74, applications software, 76, man-machine interface, 78, authentication agent 80, and electronic serial number, 82. The blocks residing on interchangeable device 18 include interchangeable device bearers, 84, external device interface software, 86, and electronic serial numbers, 88. The term "bearer" in this context is defined as any communications facility from which subscriber services are derived. This definition includes any communications device.

Layers 1, 2 and 3, shown in FIG. 5 represent the lower 3 layers of the OSI 7498 standard. The seven layers of the OSI Basic Reference Model are: (1) the physical layer; (2) the data link layer; (3) the network layer; (4) the transport layer; (5) the session layer; (6) the presentation layer; and (7) the application layer.

Also, in FIG. 5, 10 Base T is the Local Area Network (LAN) standard connection, User I/F denotes user interface, and Wi-Fi (802.11), Bluetooth and USB bear their usual meanings.

The software blocks in FIG. 5 containing communications bearers are drawn below the system services framework. These are communications channels for specific protocols typically containing layers 1, 2, and 3 of the OSI basic reference model. Wide area network bearer 70 and optionally, position location bearer, 78, are part of the communications system because they are common to all applications. All other bearers reside on interchangeable devices 18.

System services framework 74 connects the software functional blocks. It promotes modularity of the functional blocks by providing standardized messaging between them. This provides the upper layers with a higher level of abstraction so that they are unaffected by the choice of bearer being used in any particular application at any given time.

The blocks in FIG. 5 drawn above the system services framework includes man-machine interface 78, applications software, 76, authentication agent, 80, and electronic serial number (ESN), 82, on the communications apparatus. It also contains one or more external device interfaces, 86, and interchangeable device ESNs, 88 which reside on the interchangeable devices. The ESNs are read by the authentication agent, which transfers them to the authentication administrator through the system services framework and the cellular bearer channel.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. An apparatus, comprising:
   a standardized electronic interface;
   an interchangeable device that comprises a device controller, a first memory bearing a first electronic serial number, and a connector adapted to mate with to the standardized electronic interface; and
   a communications system that comprises a second memory bearing a second electronic serial number, a wireless wide area network terminal, and a control processor executing an authentication agent that is configured to transmit a report comprising the first electronic serial number and the second electronic serial number to an authentication administrator via the wireless wide area network terminal, and to receive, via the wireless wide area network terminal, an authorization command that directs the authentication agent to a) enable one or more authorized functions of the interchangeable device if the first and the second electronic serial numbers verified by the authentication administrator or b) inactivate the interchangeable device if the first and the second electronic serial numbers are not verified by the authentication administrator.

2. The apparatus of claim 1, wherein the wireless wide area network terminal is selected from the group consisting of cellular telephones and two-way pagers.

3. The apparatus of claim 2, wherein the wireless wide area network terminal comprises a cellular telephone that comprises a removable battery, wherein the interchangeable device is adapted to replace the removable battery, and wherein the cellular telephone is powered by an external battery.

4. The apparatus of claim 3, wherein the external battery comprises a vehicle battery.

5. The apparatus of claim 1, wherein the communications system further comprises a power supply.

6. The apparatus of claim 5, wherein the power supply comprises a battery.

7. The apparatus of claim 6, wherein the battery comprises a vehicle battery.

8. The apparatus of claim 1, wherein the communications system further comprises a position locator.

9. The apparatus of claim 8, wherein the position locator comprises a global positioning system apparatus.

10. The apparatus of claim 1, wherein the interchangeable device further comprises functional hardware for performing at least one chosen function.

11. The apparatus of claim 10, wherein the at least one chosen function is selected from the group consisting of digital photography, car diagnostics, position location, equipment testing, hand-free communications, microcomputer capability, and display.

12. The apparatus of claim 1, wherein the authentication agent reads the first electronic serial number from the first memory and the second electronic serial number from the second memory when the apparatus is powered on and transmits the report if either the first electronic serial number or the second electronic serial numbers differ from their previous values.

13. The apparatus of claim 1, further comprising an additional interchangeable device that comprises a position location device, an additional memory having a third electronic serial number, and an additional connector adapted to mate with the standardized electronic interface, the report further comprising the third electronic serial number.

14. The apparatus of claim 1, wherein the authentication administrator comprises a database of valid electronic serial numbers against which the first and the second electronic serial numbers are verified.

15. A method comprising:
receiving, at an authentication administrator via a wireless wide area network connection, a report from an authentication agent on a communication system, the report comprising a first electronic serial number corresponding to the communication system and a second electronic serial number corresponding to an interchangeable device attached to the communication system;
comparing the first and the second electronic serial numbers with a database of electronic serial numbers; and
transmitting, to the communication system via the wireless wide area network, an authorization command that directs the authentication agent to a) enable one or more authorized functions of the interchangeable device if the first and the second electronic serial numbers are located in the database or b) inactivate the interchangeable device if the first and the second electronic serial numbers are not located in the database.

16. The method of claim 15, wherein the communication system comprises a cellular telephone that comprises a removable battery, and wherein the interchangeable device is adapted to replace the removable battery.

17. A method comprising:
transmitting a report from an authentication agent executed on a communication system to an authentication administrator via a wireless wide area network terminal on the communication system, the report comprising a first electronic serial number read by the authentication agent from a first memory on the communication system and a second electronic serial number read by the authentication agent from a second memory on an interchangeable device attached to the communication system;
receiving, via the wireless wide area network terminal, an authorization command that directs the authorization agent to a) enable one or more authorized functions of the interchangeable device if the first and the second electronic serial numbers are verified by the authentication administrator or b) inactivate the interchangeable device if the first and the second electronic serial numbers are not verified by the authentication server.

18. The method of claim 17, wherein the communication system comprises a cellular telephone that comprises a removable battery, and wherein the interchangeable device is adapted to replace the removable battery.

19. The method of claim 17, wherein the authentication administrator comprises a database of valid electronic serial numbers against which the first and the second electronic serial numbers are verified.

20. The method of claim 17, wherein the authentication agent reads the first electronic serial number from the first memory and the second electronic serial number from the second memory when the communication system is powered on and transmits the report if either the first electronic serial number or the second electronic serial numbers differ from their previous values.

* * * * *